(12) United States Patent
Schenk et al.

(10) Patent No.: US 7,760,414 B2
(45) Date of Patent: Jul. 20, 2010

(54) OPTICAL DEVICE COMPRISING A STRUCTURE FOR AVOIDING REFLECTIONS

(75) Inventors: Harald Schenk, Dresden (DE); Thilo Sandner, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 12/058,855

(22) Filed: Mar. 31, 2008

(65) Prior Publication Data

US 2008/0239531 A1 Oct. 2, 2008

(30) Foreign Application Priority Data

Apr. 2, 2007 (DE) ................. 10 2007 015 721
Mar. 6, 2008 (DE) ................. 10 2008 012 810

(51) Int. Cl.
  *G02B 26/00* (2006.01)
  *G02B 26/08* (2006.01)
(52) U.S. Cl. ..................... 359/290; 359/224.1
(58) Field of Classification Search ........... 359/198, 359/224, 225, 290, 298, 198.1, 224.1, 225.1
  See application file for complete search history.

(56) References Cited

U.S. PATENT DOCUMENTS

2008/0137172 A1* 6/2008 Staker et al. ............... 359/291

FOREIGN PATENT DOCUMENTS

| CN | 1721911 A | 1/2006 |
|---|---|---|
| CN | 1731236 A | 2/2006 |
| JP | 2005-173435 A | 6/2005 |
| JP | 2005173435 A * | 6/2005 |

OTHER PUBLICATIONS

Official communication issued in counterpart Chinese Application No. 200810081806.2, issued on Jun. 19, 2009.

* cited by examiner

*Primary Examiner*—William C Choi
(74) *Attorney, Agent, or Firm*—Keating & Bennett, LLP

(57) ABSTRACT

An optical device includes a deflectable optical functional structure for interacting with electromagnetic radiation incident thereon, and a protective structure which is associated to the optical functional structure and at least partly transparent for the electromagnetic radiation. The optical functional structure is arranged in a manner tilted relative to the protective structure so that, in a non-deflected position of the optical functional structure, a main beam path of the electromagnetic radiation which interacts with the optical functional structure through the protective structure has an angle relative to a sub-beam path of the electromagnetic radiation reflected at the protective structure.

18 Claims, 5 Drawing Sheets

OPTICAL DEVICE COMPRISING A STRUCTURE FOR AVOIDING REFLECTIONS

CROSS-REFERENCE TO RELATED APPLICATIONS

This application claims priority from German Patent Application No. 102007015721.7, which was filed on Apr. 2, 2007 and German Patent Application No. 102008012810.4, which was filed on Mar. 6, 2008, which are both incorporated herein by reference in their entirety.

TECHNICAL FIELD

The present invention relates to an optical device in which disturbing reflections of electromagnetic radiation are avoided in the operating range of the optical device. In particular, the invention relates to micromechanical one- and two-dimensional scanner mirrors, phase-shifting mirrors and other optical elements in which the functionality may be affected by reflections of electromagnetic radiation interacting with the optical device at a cover glass and/or a protective structure.

BACKGROUND

In elements of this kind, the cover glass and/or protective structure can have the function of protecting the device from dust and impurities and/or ensuring a certain environmental atmosphere, like, for example, a certain pressure, a certain humidity or a certain type of gas, within the optical device. At the same time, it should be possible to couple in and out a light beam and/or electromagnetic radiation. The cover glass may be deposited on the wafer level already in manufacturing, so-called wafer-level packaging, or may exemplarily also be deposited as a sealing in a packaging process.

Micromechanically produced chips or devices including optical functions here are, for example, scanner mirrors, so-called scanning gratings, bolometers, photodiodes and photodiode arrays, charge-coupled device (CCD) arrays, complementary metal oxide semiconductor (CMOS) image sensors, display applications or light modulators. These chips and/or devices are to be protected against, for example, contamination by particles, against humidity or also high-energy radiation from the ultraviolet (UV) and the deep ultraviolet (DUV) radiation ranges or be operated under vacuum or certain inert gas conditions. Furthermore, the optical devices necessitate at least one optical interface realized by a window or protective structure which is transparent for the wavelength range necessary for the device.

There are a number of manufacturing methods for manufacturing optical devices of this kind including protective structures.

The diced chips can be packaged. At first, the individual chips or devices are produced by sawing, laser cutting or specifically breaking a wafer. Subsequently, the diced chips are bonded in respective standard or special packages. After that, electrical contacting of the device can be performed by means of wire bonding. Alternatively, the chip may, for example, on its back side, comprise a ball grid array comprising contact pads via which electrical contacting may be performed. Subsequently, the package may be sealed by applying a transparent cap which serves as a protective structure. In this method, before the actual packaging or capping, the chip may be tested on the wafer level so that only functional chips will be continued to be processed. However, the chips are separated from the wafer without any protection of the surface, for example by sawing or breaking, thereby making the process more complicated and potentially causing additional failures on the wafer level after the functional test. Another essential disadvantage of this solution is the usage of relatively expensive individual packages.

Alternatively, the chip may be capped by wafer bonding. The wafer including the optical devices and/or sensor/actor chips here may be connected to a second wafer, the so-called cap wafer such that a full-area cap results. The cap wafer here may exemplarily be a glass wafer for the necessary visible wavelength range or be made of silicon for the infrared wavelength range. If appropriate, a so-called spacer is used which ensures that there is a certain spacing between the wafer containing the optical devices and/or sensor/actor chips and the cap wafer. This may be necessary when mechanical elements of the sensor/actor wafer must not be limited in their movement. Exemplarily, a base wafer may be bonded to the back side of the sensor/actor wafer. This may, for example, be necessary when a vacuum is necessary for operation, the sensor/actor wafer, however, is perforated, but is to be vacuum-sealed. This method of wafer bonding for capping the chip is of advantage in that the chips are capped before dicing and are thus considerably less sensitive to the further dicing and processing procedure.

Another way of manufacturing optical devices including protective structures is using so-called pick & place machines, using which individual caps and/or protective structures may be placed onto a wafer with high position accuracy and precision. Using bonding layers, like, for example, glue or solder, a connection can be made between the sensor/actor wafer and the cap placed thereon. This method is of advantage in that the chips can be characterized on the wafer level before capping and caps will then only be placed on the functional chips. The functional chips specified for further processing will then, like in wafer bonding, be considerably less sensitive to the dicing and processing procedure. If appropriate, this method may be combined with a wafer bonding method for the back side of the sensor/actor wafer, i.e. of the wafer comprising the optical device.

In all the cases described, the transparent caps and/or protective structures are applied in parallel to the chip surface. The parallelity of the cap and chip surfaces generally is not a problem for purely optical sensors. However, if the electromagnetic radiation and/or the light is not only coupled in, but also out again, like, for example, in the case of light modulators or scanner mirrors, disturbing light reflections may occur on the protective structure and/or the cover glass due to the parallelity of the cap and chip surface. Anti-reflection layers on the top and bottom of the cap can reduce, but not eliminate completely, this effect. An example to be mentioned is a two-dimensional deflecting scanner mirror for image projection. By the two-dimensional deflection of the scanner mirror, a laser beam directed onto the scanner mirror is guided over an image field which corresponds to the operating range. The desired image results by modulating the laser intensity in dependence on the position of the laser spot. However, the laser beam, before impinging on the scanner mirror, is also reflected partly at the cover glass. If the scanner mirror is deflected symmetrically around its zero state, the residual reflection at the cap will cause a laser point in the image center of the operating range.

In order to illustrate the order of magnitude of this effect, it is assumed that the laser is not modulated, i.e. generates a maximally light image field. The laser intensity I is, for example, distributed to 640×480=307,200 image points. The result, assuming a one hundred percent transmission of the cover glass, is a mean intensity of I/307,200 for each image point. Assuming that the cap has an anti-reflection layer and thus a residual reflection of 1−99.9%=0.01%, an additional intensity for the image point in the center will be roughly I/10,000. This is about 30 times the intensity of the remaining image point and thus disturbing for an observer.

The schematic structure of a known micromechanical scanner mirror in a standard package comprising a glass cap will be described referring to FIG. 1. The optical device 1 is a scanner mirror 2. The scanner mirror 2 comprises a mirror plate 3 rotatable around an axis perpendicular to plane of the drawing. The scanner mirror 2 may exemplarily be connected to the base 11 of the package by glue and/or a glued connection 15. A coated glass cap 7, which may exemplarily be connected to the frame 9 by means of glass solder or by means of glue and, in particular, has the task of keeping contamination and particles away from the scanner mirror and the mirror plate 3, is deposited on the frame 9 of the package. An electrical connection to the package including the parts 11, 9, 7 can be made via contact areas or bond pads 13. The respective contacting and/or bond wires and contacts are not shown in FIG. 1 for purposes of simplification. If the mirror plate 3 in the undeflected state is arranged in parallel to the chip surface and the glass cap and the main beam path 5 of a light beam penetrates the transparent glass cap 7 and hits the mirror plate 3, the reflected main beam path 5a will result by the reflection of the main beam path 5 at the mirror 3. If the mirror plate 3 is deflected, as is indicated in the drawing by the plate 3b indicated in broken lines, the reflection of the main beam path 5 will result in the reflected main beam path 5c. Thus, the angle between the light beams 5a and 5c is double the deflection angle between the positions of the plates 3 and 3b. The case in which the plate 3 is deflected by the same amount in a direction opposite to 3b is not shown. This would result in a further main beam path and/or light beam such that the main beam path 5 would result in exactly the bisector of the angle between this light beam and the light beam 5a. Since an anti-reflection layer of the glass cap 7 exhibits a residual reflection, what results is a sub-beam path 5b. The latter is of a considerably lower intensity than the main beam path 5a and 5c, respectively, but has a disturbing effect in the application, as has already been shown before by the estimate for a projection display. Further multiple reflections caused by the reflection at the glass cap 7 and the plate 3 are not illustrated in FIG. 1.

SUMMARY

According to an embodiment, an optical device may have: a deflectable optical functional structure for interacting with electromagnetic radiation incident thereon; a protective structure which is associated to the optical functional structure and at least partly transparent for the electromagnetic radiation; wherein the optical functional structure is arranged in a tilted manner with respect to the protective structure so that, in a non-deflected position of the optical functional structure, a main beam path of the electromagnetic radiation which interacts with the optical functional structure through the protective structure has an angle relative to a sub-beam path of the electromagnetic radiation reflected on the protective structure.

Embodiments of the invention provide an optical device in which tilting of the deflectable optical functional structure relative to the protective structure is achieved by an apparatus for tilting the deflectable optical functional structure.

In accordance with another embodiment of the present invention, the optical functional structure may be tilted relative to the protective structure by a bimorph element.

The optical functional structure of the optical device may, for example, comprise a frame in which a deflectable mirror is arranged. The frame with its deflectable mirrors may be fixed after being tilted in a manner conclusive as to shape, force or material. Furthermore, the optical functional structure may be implemented in a substrate, like, for example, a wafer substrate made of silicon, and be installed in a package, wherein the surface of the bottom of the package and/or the wafer surface may be oriented in parallel to the protective structure for the optical device.

BRIEF DESCRIPTION OF THE DRAWINGS

Embodiments of the present invention will be detailed subsequently referring to the appended drawings, in which.

DETAILED DESCRIPTION

Figure 2:
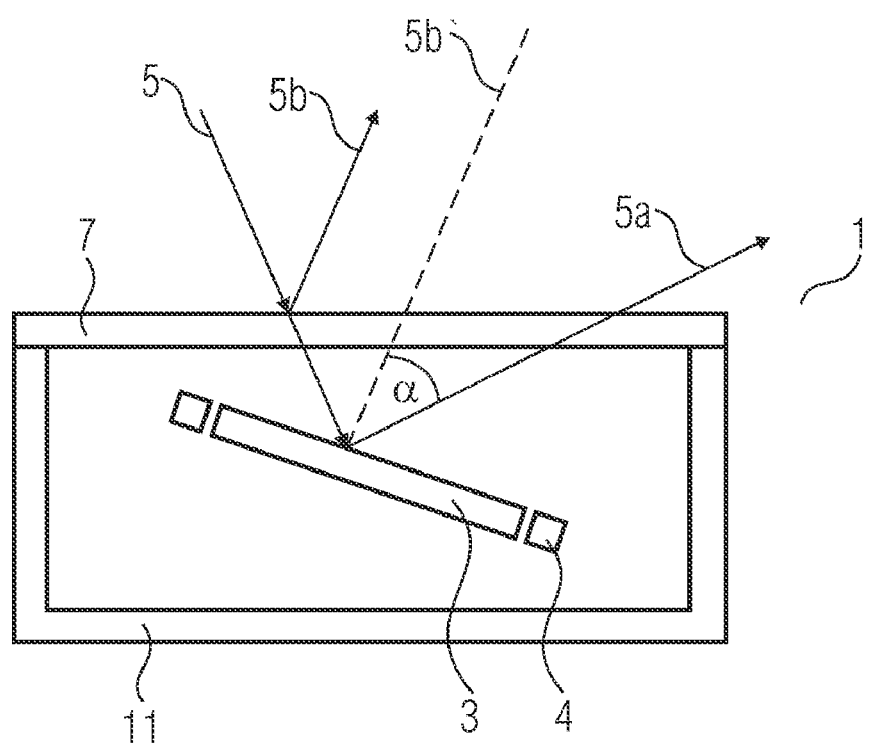
FIG. 2 is a schematic illustration of an embodiment of the present invention.

FIG. 2 shows a schematic cross-sectional illustration of an optical device 1 according to an embodiment of the invention. The optical device 1 comprises a deflectable optical functional structure 3 for interacting with electromagnetic radiation 5 incident thereon. The optical functional structure 3 may be composed of several parts, like, for example, an additional frame structure 4. Additionally, the optical device 1 comprises a protective structure 7 which is associated to the optical functional structure 3 and is transparent for the electromagnetic radiation 5. The optical functional structure 3 is arranged in a manner tilted relative to the protective structure 7 so that, in the non-deflected position, a main beam path 5 of the electromagnetic radiation which interacts with the optical functional structure 3 through the protective structure 7 has an angle α relative to a sub-beam path 5b of the electromagnetic radiation reflected at the protective structure 7. In FIG. 2, the angle α is illustrated by the parallel shift of the sub-beam path from 5b to 5b'.

It is to be mentioned in this context that the optical device comprising the optical functional structure may interact with electromagnetic radiation from the visible spectral range, the infrared spectral range or even the ultraviolet spectral range and correspondingly the protective structure for the respective spectral range exhibits a correspondingly high transmission.

Figure 1:
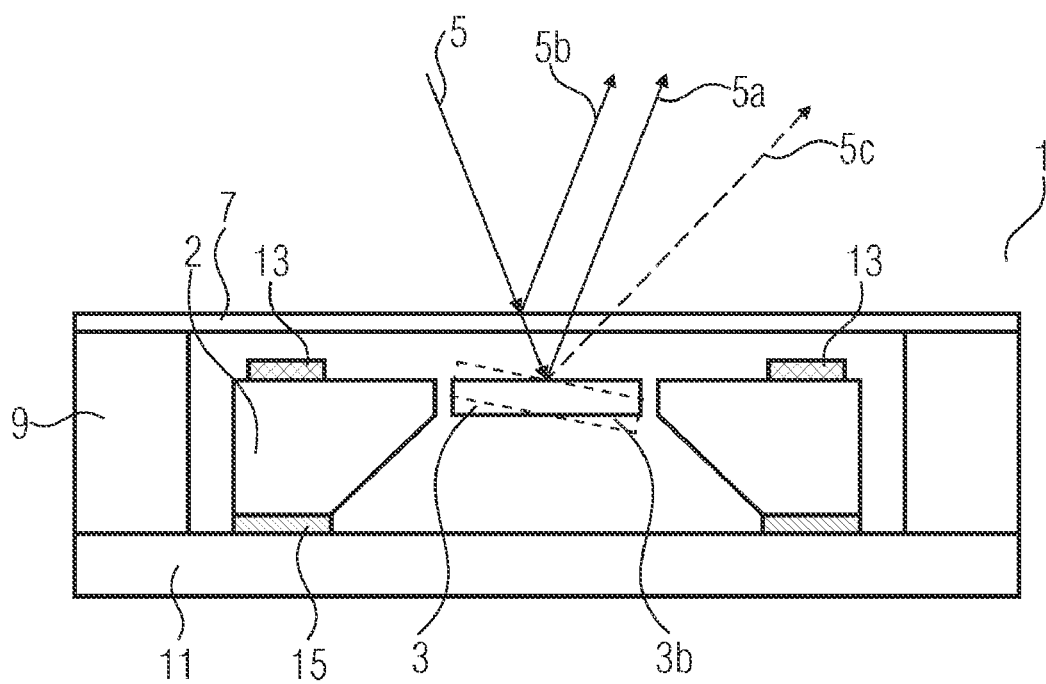
FIG. 1 is a schematic cross-sectional illustration of a known micromechanical scanner mirror in a package comprising a glass cap.
Figure 3:
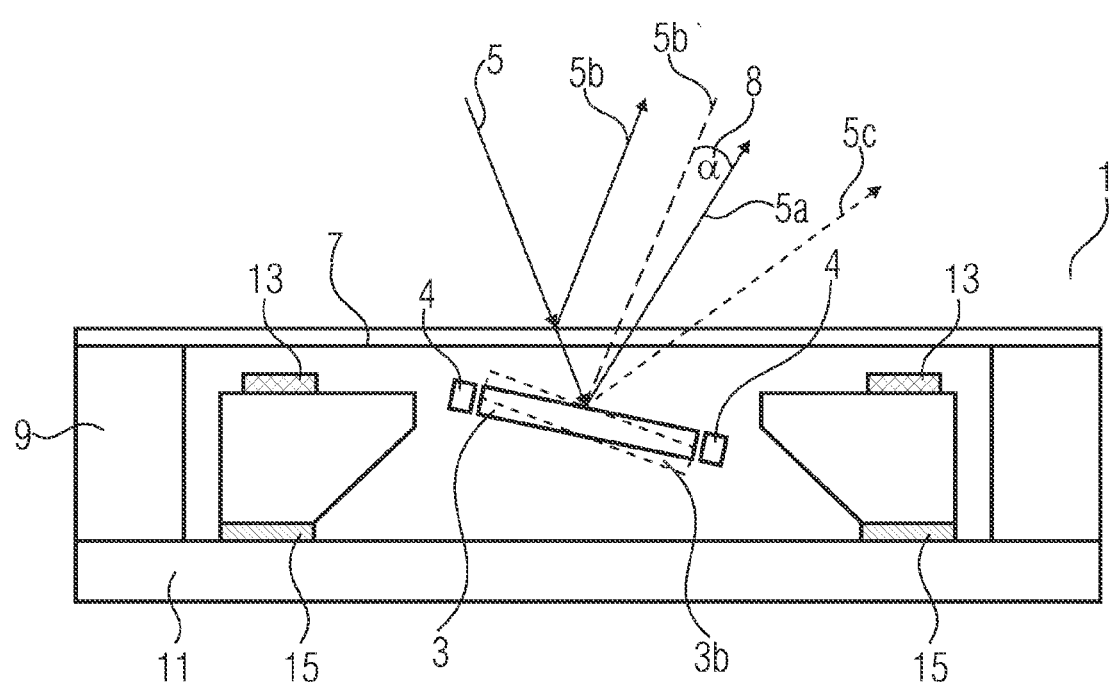
FIG. 3 is a schematic cross-sectional illustration of a micromechanical scanner mirror in a package comprising a glass cap according to an embodiment of the present invention.

FIG. 3 shows an embodiment in which the optical functional structure 3, similarly to FIG. 1, which here, for example, is a mirror plate 3, is suspended in a frame 4. The deflectable optical functional structure in this example is the mirror plate 3 which is suspended in the frame 4. The frame 4 is deflected by an angle relative to the parallel area of the cap 7 and the bottom 11 of the package and mounted fixedly in this deflected position. If the mirror plate 3 is in the non-deflected position, i.e. in parallel to the tilted frame 4, the main beam path 5a reflected at the mirror plate 3 will no longer be parallel to the sub-beam path 5b reflected at the glass cap 7. Rather, the angle α (see reference numeral 8) forms between the reflected main beam path 5 and the sub-beam path 5a. This is illustrated in the figure by the parallel shift of the sub-beam path 5b to 5b'. As long as the deflection of the mirror plate 3 in a counter-clockwise direction is smaller than the angle α, the sub-beam 5b reflected at the glass cap 7 will not be within the operating range reflected at the mirror plate 3, i.e. the scanned region. In the clockwise direction, as is indicated in FIG. 3 by the mirror plate 3b indicated in broken lines and the respective main beam path 5c, the mirror plate can still be deflected anyway without the beam 5 b reflected at the glass cap 7 to be within the operating range of the scanner. If the mirror plate 3 is suspended such that it can perform a two-dimensional deflection of a light beam, i.e. if the mirror plate can be tilted in two dimensions by another axis which is perpendicular to the first axis (not shown in FIG. 3), a sufficiently large deflection or tilting of the frame 4 in one direction will be sufficient to direct the sub-beam reflected at the glass cap or, more generally, at the protective structure or the transparent lid, outside the scanning region. When projecting images, for example, a reflection within the projected image can be avoided by this.

Figure 4:
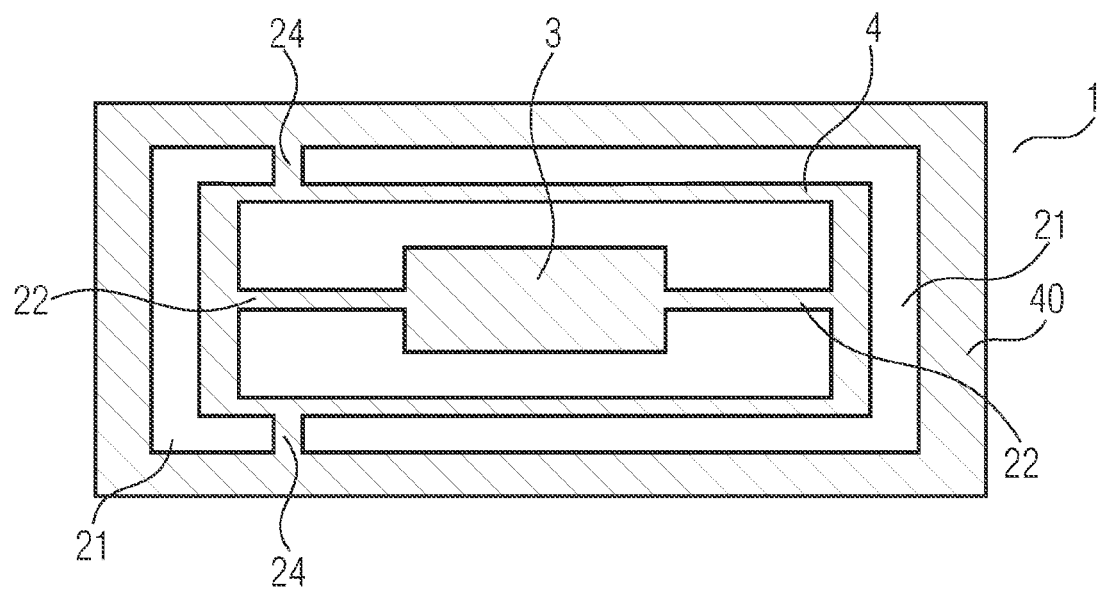
FIG. 4 is a top view illustration of an optical device comprising a tiltable frame and a deflectable mirror plate arranged therein according to an embodiment of the present invention.

FIG. 4 shows a top-view illustration of an embodiment of the optical device 1 in which the frame 4 is tilted around an axis 24 which is perpendicular to the axis 22 of the mirror plate 3. The axis 24 is stored in a substrate 40. The optical functional structure includes the frame and the mirror plate. In this embodiment, the tilting axis 24 of the frame 4 is not the symmetry axis of the movable frame. In principle, the tilting angle can be adjusted by selecting the position of the axis when the distance to the bottom of the package is known. The frame tilting here may be in the direction of the bottom of the package and/or substrate surface or in the direction of the glass cap and/or protective structure. The optical functional structure 3 comprising the frame 4 may, for example, be manufactured in the so-called silicon-on-insulator (SOI) technology and the areas 21 can be realized by etching a top single-crystalline silicon layer, namely the substrate 40, and represent trench structures.

In order to tilt the optical functional structure, an external mechanism and/or an external device, like, for example, a probe or pin, may be used. Another way of tilting is, for example, integrating an actor which operates, for example, in accordance with the piezoelectric, electrostatic, thermal, magnetic or another principle in order to apply a force onto the frame 4 such that it can be tilted to the desired position. The frame may then be fixed to the bottom 11 of the package, the frame 9 or the package cap 7 and/or the bottom of the substrate. It is also conceivable for the frame with the mirror plate arranged therein to be fixed by a glue applied onto the chip surface, by a photoresist, a metal or solder. The frame may also be held and/or locked by mechanical fixing implemented in the optical device. The frame including the mirror plate may also comprise special spring mechanisms and contact areas, so-called pads, onto which a force for deflection may act and which allow easy tilting and/or fixing.

The frame may be deflected by external means or using integrated actors and the position of the optical functional structure may be fixed for example by liquefying a material which has already been present on the chip before deflection, or a material which is applied onto the chip while the frame is held in a deflected position, by heating or converting same to the plastic state and then solidifying same when cooling. Instead of torsion springs, the frame may also be suspended by bending springs or, as shown below, be deflected by tensed layers introduced in the manufacturing process.

Figure 5:
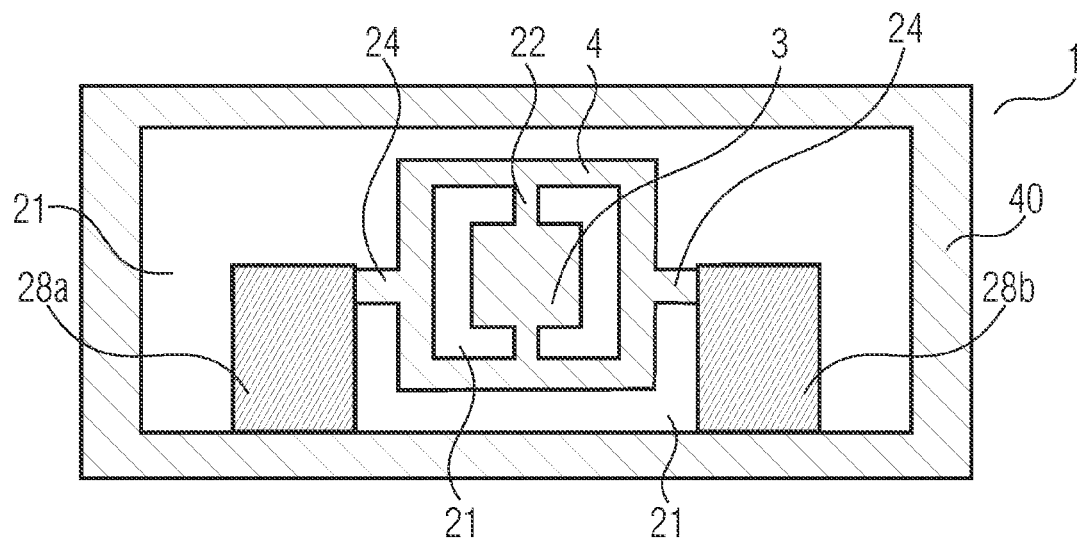
FIG. 5 is a top view illustration of the embodiment of the optical device of FIG. 4 comprising a bimorph element for tilting the frame.

FIG. 5 shows a top-view illustration of another embodiment of the optical device 1 which again comprises the frame 4 and the mirror 3 deflectable therein via an axis 22, wherein the frame 4 to be tilted is connected to two bimorph bending bars 28a and 28b which are illustrated in the drawing in a hatched manner via mechanical connections 24. The bimorph element may, for example, be manufactured by applying a thermal oxide layer onto a silicon layer. The thermal oxide may, for example, be produced at temperatures of around 1000° C. Due to the different thermal extension coefficients of the oxide layer and the silicon layer, the bimorph element may bend when cooling. The result is that the entire frame can be lowered and thus at the same time tilted, for example in the direction of the bottom of the package and/or the substrate. The tilting angle here will be temperature-dependent should the bimorph element and/or the frame not be fixed. The bimorph element may principally be made of most different combinations of layers.

Depositing the layer may also take place at different temperatures (T<1000° C.) than at high temperatures. It is also sufficient to use layers of high mechanical stress, like, for example, $SiN_3$. Typical layers, from which at least two are selected for manufacturing the bimorph, are amorphous silicon, single-crystalline silicon or poly-crystalline silicon, thermal oxide, oxides manufactured by physical vapor deposition (PVD) or chemical vapor deposition (CVD), silicon nitride or metals, like aluminum, aluminum alloys, gold, silver, copper, titanium, platinum and others. Additionally, polymers, resists, benzocylobutene (BCB), polyimide and other organic materials, as well as doped oxides which are deposited by means of PVD or CVD may exemplarily also be used.

Should manufacturing the bimorph element not be the last step of processing the surface and further process steps, like, for example, special photolithographic ones, follow for defining fine structures, it may be of advantage to prevent the frame from tilting at first. Depositing a photoresist may be problematic in structures comprising great differences in topology, and additionally only a limited field depth will be available when the photo resist is exposed.

Figure 6:
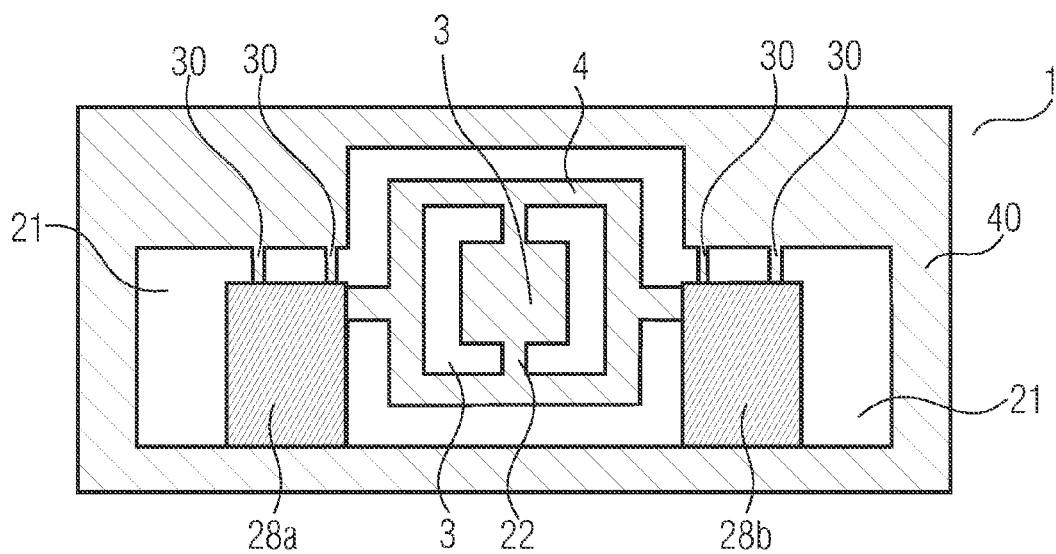
FIG. 6 is a top view illustration of the embodiment of the optical device of FIG. 5 where the bimorph element is fixed by lands.

FIG. 6 shows another embodiment of the optical device 1 in which the optical functional structure 3 which is to be tilted relative to the protective structure by bimorph elements 28a, 28b will be fixed at first by lands 30. The optical device 1 comprises the deflectable optical functional structure which is composed of the tiltable frame 4 and the mirror plate 3 which is suspended in the frame 4 so as to be deflectable around axes 22. The frame 4 including the mirror 3 is connected to two bimorph bending bars 28a and 28b via mechanical connections 24. The two bimorph bending bars 28a and 28b are at first fixed by the lands 30 preventing the frame 4 including the deflectable mirror 3 from being tilted as long as the lands 30 are not removed. This fixing may be maintained for all the process steps following the bimorph manufacturing.

Cutting the lands 30 may, for example, take place mechanically, like, for example, by breaking or separating the lands by means of laser radiation, by reflow and/or ablating, or even by electrical reflow. In the latter case, a current of suitable magnitude can be sent through conductive lands 30. Since the lands have a smaller cross-section than the other structures, the lands will heat up the most. The land material is liquified by heating and the bimorph element will be able to tilt. Thus, the mechanical connection by the lands may be removed completely. However, if the temperature is only increased to an extent that the lands may be deformed plastically, the bimorph element may also deflect. However, with suitable process control, the material connection between the lands and the bimorph elements may be maintained. If the current flow is interrupted, the material will again take the solid state and the bimorph element be fixed in the corresponding position. The result is that the temperature dependence of tilting will no longer be there and/or be reduced strongly.

Exemplarily, it is also conceivable for the optical device to comprise a contact area on the deflectable optical functional structure where applying a force may take place by means of an external device, like, for example, a probe or a pin, by means of which the deflectable optical functional structure may be deflected and/or tilted permanently. The tilting may, for example, also be a deflection, rotation by a corresponding torque or a translatory motion.

What is described in embodiments of the invention is an optical device which allows, for example on the wafer level or in the package, applying a protective structure or a cap such that the optical window and the chip surface are arranged in parallel to each other and such that reflections at the transparent cap do not affect the functionality of the device. This may, for example, take place by tilting the optical functional structure. Since a tilted application of glass caps or protective structures is difficult to realize as far as manufacturing technology is concerned, which is, above all, true for applying a protective wafer, a structure which contains the optically active element and is arranged such that it can be tilted to such a degree that reflections at the glass cap parallel to the chip surface do not affect the functionality of the device may be integrated in the device. Thus, both in one-dimensional and also two-dimensional scanners, in phase-shifting mirrors or other optically active elements, for example, an aperture can be introduced into the beam path such that only the beams reflected by the mirror plate may pass the aperture. The beams reflected at the glass plate are blocked by the aperture and thus have no disturbing effect for the user and/or the system.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An optical device comprising:
    a deflectable optical functional structure for interacting with electromagnetic radiation incident thereon;
    a protective structure which is associated to the optical functional structure and at least partly transparent for the electromagnetic radiation; wherein
    the protective structure is parallel to a surface of a substrate comprising the deflectable optical function structure; and
    the optical functional structure is arranged in a manner tilted relative to the protective structure such that, in a non-deflected position of the optical functional structure, a main beam path of the electromagnetic radiation which interacts with the optical functional structure through the protective structure comprises an angle relative to a sub-beam path of the electromagnetic radiation reflected at the protective structure.

2. The optical device of claim 1, wherein the deflectable optical functional structure comprises a frame including a mirror structure deflectable therein.

3. The optical device of claim 1, wherein the optical device comprises an apparatus for tilting the deflectable optical functional structure.

4. The optical device of claim 3, wherein the apparatus for tilting comprises an integrated actuator, the actuator providing or utilizing a thermal, electrostatic, piezoelectric, magnetic or other physical or chemical effect or force for deflecting the deflectable optical functional structure relative to the protective structure.

5. The optical device of claim 3, wherein the apparatus for tilting includes a bimorph element.

6. The optical device of claim 1, comprising an apparatus for fixing the optical functional structure in the tilted position.

7. The optical device of claim 6, wherein the apparatus for fixing fixes the optical functional structure to the protective structure and/or the surface of the substrate.

8. The optical device of claim 6, wherein the apparatus for fixing comprises a glue, photoresist, metal, solder or a mechanical fixer.

9. The optical device of claim 1, wherein the optical functional structure is implemented to interact with electromagnetic radiation from the ultraviolet spectral range, the visible spectral range or the infrared spectral range.

10. The optical device of claim 1, wherein the protective structure comprises glass, plastic, silicon, ceramic or metal.

11. The optical device of claim 1, wherein the substrate comprises silicon, gallium arsenide, gallium nitride, indium phosphide or silicon carbide.

12. The optical device of claim 1, wherein the protective structure is part of a package in which the optical device is arranged.

13. The optical device of claim 1, wherein the optical device is a one- or two-dimensional scanner mirror.

14. The optical device of claim 1, wherein the optical device is a phase mirror or a light modulator.

15. The optical device of claim 1, wherein the optical functional structure is fixed by lands.

16. The optical device of claim 1, further comprising separated land parts.

17. The optical device of claim 1, wherein the optical functional structure is manufactured micromechanically.

18. The optical device of claim 1, wherein the protective structure comprises a wafer bond connection, solder connection, eutectic connection or glued connection to the optical device.

* * * * *